US012451603B2

(12) United States Patent
Gaier et al.

(10) Patent No.: US 12,451,603 B2
(45) Date of Patent: Oct. 21, 2025

(54) MULTIBAND LOOP ANTENNA

(71) Applicant: BSH Hausgeräte GmbH, Munich (DE)

(72) Inventors: Stefan Gaier, Stuttgart (DE); Matthias Lungwitz, Mössingen (DE)

(73) Assignee: BSH Hausgeräte GmbH, Munich (DE)

( * ) Notice: Subject to any disclaimer, the term of this patent is extended or adjusted under 35 U.S.C. 154(b) by 170 days.

(21) Appl. No.: 18/011,933

(22) PCT Filed: Jul. 8, 2021

(86) PCT No.: PCT/EP2021/068996
§ 371 (c)(1),
(2) Date: Dec. 21, 2022

(87) PCT Pub. No.: WO2022/022976
PCT Pub. Date: Feb. 3, 2022

(65) Prior Publication Data

US 2023/0246333 A1 Aug. 3, 2023

(30) Foreign Application Priority Data

Jul. 29, 2020 (DE) ..................... 10 2020 209 545.0

(51) Int. Cl.
*H01Q 5/321* (2015.01)
*H01Q 1/22* (2006.01)
(Continued)

(52) U.S. Cl.
CPC ............... *H01Q 5/321* (2015.01); *H01Q 1/22* (2013.01); *H01Q 5/357* (2015.01); *H01Q 5/378* (2015.01); *H01Q 7/00* (2013.01)

(58) Field of Classification Search
None
See application file for complete search history.

(56) References Cited

U.S. PATENT DOCUMENTS

| | | | | |
|---|---|---|---|---|
| 6,943,730 B2 * | 9/2005 | Poilasne | .............. | H01Q 9/0421 343/702 |
| 7,084,813 B2 * | 8/2006 | Pathak | .................. | H01Q 5/357 343/846 |

(Continued)

FOREIGN PATENT DOCUMENTS

DE 102015215987 A1 2/2017

*Primary Examiner* — Dameon E Levi
*Assistant Examiner* — Anh N Ho
(74) *Attorney, Agent, or Firm* — Laurence A. Greenberg; Werner H. Stemer; Ralph E. Locher

(57) ABSTRACT

A multiband loop antenna includes a first, electrically conductive, L-shaped partial structure on a first layer of a printed circuit board. The first partial structure has a first resonant frequency and a feed point of the antenna. The multiband loop antenna includes a second, electrically conductive, L-shaped partial structure on the first layer of the circuit board. The second partial structure is configured for a second resonant frequency. The first partial structure and the second partial structure are capacitively coupled to one another in a coupling region. The multiband loop antenna includes an electrically conductive first reference region. The first partial structure and the second partial structure are disposed on the first layer of the circuit board in such a way that they form a loop together with the first reference region. A household appliance including a communication unit having the multiband loop antenna is also provided.

15 Claims, 1 Drawing Sheet

(51) Int. Cl.

| | |
|---|---|
| ***H01Q 5/357*** | (2015.01) |
| ***H01Q 5/378*** | (2015.01) |
| ***H01Q 7/00*** | (2006.01) |

(56) References Cited

U.S. PATENT DOCUMENTS

| | | | | |
|---|---|---|---|---|
| 7,733,271 | B2 * | 6/2010 | Moon .................. | H01Q 9/0442 343/834 |
| 7,782,258 | B2 | 8/2010 | Lee et al. | |
| 8,174,457 | B1 | 5/2012 | Lam | |
| 8,860,614 | B2 | 10/2014 | Asrani et al. | |
| 10,516,211 | B2 | 12/2019 | Reitner | |
| 2004/0233111 | A1 | 11/2004 | Desclos et al. | |
| 2005/0195124 | A1 * | 9/2005 | Puente Baliarda .. | H01Q 9/0414 343/893 |
| 2008/0180333 | A1 * | 7/2008 | Martiskainen ........... | H01Q 1/38 343/722 |
| 2009/0146884 | A1 * | 6/2009 | Lee .......................... | H01Q 7/00 343/700 MS |
| 2013/0214986 | A1 * | 8/2013 | Zhu ........................ | H01Q 1/243 343/866 |
| 2018/0205150 | A1 * | 7/2018 | Reitner ................ | H01Q 1/2291 |
| 2020/0091595 | A1 * | 3/2020 | Lee .......................... | H01Q 1/22 |

* cited by examiner

MULTIBAND LOOP ANTENNA

FIELD AND BACKGROUND OF THE INVENTION

The invention relates to a loop antenna for transmitting or for receiving radio signals, wherein the loop antenna is implemented on a circuit board.

An electronic device that is configured in order to communicate via a wireless communication network typically comprises at least one antenna for receiving and/or for transmitting radio signals. In this case, the electronic device can be configured so as to receive or to transmit radio signals over a plurality of different frequency bands, in particular over two different frequency bands or frequency ranges. For this purpose, the device can comprise a multiband antenna, in particular a dual band antenna. Exemplary dual band antennas can be provided for example for the frequency bands 2.4-2.5 GHz and 5.1-5.8 GHz, in other words for WLAN (wireless local area network).

Antennas typically require a reference mass or reference plane for their function. The size and the shape of a reference mass of this type typically have a significant influence on the function and beam characteristic of an antenna. An antenna is frequently to be used as a circuit board structure or as a superimposed metal structure (for example as a stamped-bent part) in different sized circuit boards. The different sized circuit boards represent different distinct reference masses for an antenna. Furthermore, plastic in the environment of the antenna (for example on account of a housing) can influence the characteristics of an antenna. As a consequence thereof, typically a new antenna calibration is required for each circuit board geometry and/or application. An antenna calibration of this type can be initiated for example by changing the antenna structure.

SUMMARY OF THE INVENTION

The present document deals with the technical object of providing a (multiband or dual band) antenna that in an efficient manner (in particular without the requirement for a dedicated antenna calibration) can be integrated into different distinct circuit boards and/or into different environments. In other words a multiband antenna is to be provided that is not sensitive with respect to variations in the environment of the antenna.

The object is achieved by the independent claim. Advantageous embodiments are described inter alia in the dependent claims.

In accordance with one aspect, a multiband loop antenna is described. In this case, the multiband loop antenna that is described in this document can be implemented in an efficient manner on circuit boards that are dimensioned differently and/or in different environments or applications (in particular in different devices). A circuit board typically comprises an electrically conductive first (outer) layer (for example a front layer) and also an electrically conductive second (outer) layer (for example a lower layer). The one or more layers can be electrically insulated from one another by one or more dielectric layers. The first and second layer can comprise respectively an electrically conductive material, in particular copper. In this case, the electrically conductive material can be removed at least in regions from the respective layer, in particular in order to form a free space or a gap between an (electrically conductive) antenna structure and an (electrically conductive) reference region.

The multiband loop antenna comprises a first electrically conductive L-shaped partial structure on the first layer of the circuit board. The first partial structure can comprise a first resonance frequency. In particular, the first partial structure can form a first L antenna for a first frequency range around the first resonance frequency. The first frequency range can comprise, in particular can be, 2.4-2.5 GHz.

The first partial structure has a feed-in point on the antenna via which an RF (radio frequency) signal that is to be transmitted can be fed into the antenna and/or an RF signal that is received can be output from the antenna.

Furthermore, the multiband loop antenna comprises a second electrically conductive L-shaped partial structure on the first layer of the circuit board. In this case, the second partial structure can be designed for a second resonance frequency and consequently for a second frequency range. The second partial structure can form a second L antenna for the second frequency range around the second resonance frequency. The second frequency range can comprise, in particular can be, 5.1-5.8 GHz.

The first partial structure and the second partial structure are coupled to one another in a coupling region in a capacitive manner. The coupling region can be designed in this case in such a manner that an RF signal having a frequency from the second frequency range is transmitted via the coupling region (for example from the feed in point to the second partial structure or from the second partial structure to the feed in point.

Moreover, the multiband loop antenna comprises an electrically conductive first reference region that can be placed for example on a ground potential. The surface of the first reference region is typically significantly larger, in particular by a factor of 5 or more, or of 10 or more, than the surface of the two partial structures.

The first partial structure and the second partial structure are arranged on the first layer of the circuit board in such a manner that together with the first reference region said partial structures form a loop or a horseshoe bend or a frame. It is consequently possible to provide a loop antenna from multiple partial structures for in each case different frequency ranges. A multiband loop antenna can thus be provided that is not sensitive with respect to variances in the environment of the antenna and can consequently be installed in different devices in a flexible manner.

The second partial structure can be connected to the first reference region in an electrically conductive manner and can be designed in particular as a parasitic element of the multiband loop antenna.

On the other hand, an electrically insulating gap or free space can be arranged between the first partial structure and the first reference region. The feed in point can then be arranged on the end of the first partial structure that is facing the gap or free space. It is thus possible in a particularly efficient and compact manner to provide a multiband loop antenna. In particular, it is thus rendered possible to transmit the RF signals for multiple different frequency bands, in particular for the first and the second frequency band, via a single feed in point.

The first partial structure can have a first limb and a second limb that together form the L-shape. In this case, the first limb can be shorter than the second limb. The first limb of the first partial structure can extend, in particular in a perpendicular manner, away from the first reference region.

In a corresponding manner, the second partial structure can have a first limb and a second limb that together form an L-shape. In this case the first limb can be shorter than the second limb. The first limb of the second partial structure can extend, in particular in a perpendicular manner, away from the first reference region.

The second limb of the first partial structure can extend, in particular in a perpendicular manner with respect to the first limb of the first partial structure, towards the second partial structure. In a corresponding manner, the second limb of the second partial structure extends, in particular in a perpendicular manner with respect to the first limb of the second partial structure, towards the first partial structure. In this case, the second limb of the two partial structures can extend parallel with respect to one another.

The first L-shaped partial structure and the second L-shaped partial structure can consequently be arranged with respect to one another in such a manner that they together form a U-shape. It is thus possible to provide a multiband loop antenna in a particularly efficient and compact manner.

The second limb of the first partial structure can adjoin the second limb of the second partial structure in the coupling region. Furthermore, the second limb of the first partial structure and the second limb of the second partial structure, can extend parallel with respect to one another, in particular in the coupling region. Moreover, a part of the second limb of the first partial structure and a part of the second limb of the second partial structure can extend directly adjacent to one another in the coupling region and can be spaced from one another by an electrically insulating coupling gap.

In one preferred example, the part of the second limb of the first partial structure and the part of the second limb of the second partial structure, which extend directly adjacent to one another in the coupling region, correspond to in each case less than 50%, in particular less than 30%, of the limb length of the respective second limb and/or in each case more than 10% of the limb length of the respective second limb. It is thus possible to form a particularly reliable capacitive coupling between the partial structures.

Parts of the second limb of the two partial structures can consequently together form a capacitor for a capacitive coupling of the two partial structures in order to provide a multiband loop antenna in an efficient and compact manner.

The first limb of the first partial structure and the first limb of the second partial structure can extend in each case to a specific edge of the circuit board. In this case, the antenna can be designed in such a manner that the second limb of the first partial structure is arranged in the coupling region closer to the edge of the circuit board than the second limb of the second partial structure. In particular, a part of the second limb of the second partial structure can be shielded by a part of the second limb of the first partial structure from the edge of the circuit board. The second partial structure can consequently be arranged at a relatively large spacing with respect to the edge of the circuit board. It is thus possible to further reduce the sensitivity of the antenna, in particular then if the second partial structure is designed for a (second) frequency range having higher frequencies than the first partial structure.

The first and/or the second partial structure can have an increased width with respect to the limb width of the limbs in a transition region between the limbs of the respective partial structure (in particular at the point at which the two limbs are connected to one another). It is possible to increase the bandwidth of the frequency range of the respective partial structure by increasing the width of a partial structure in the transition region.

The limbs of the first partial structure can have an overall length that depends on the first resonance frequency. In particular, the first partial structure can be designed as a $\lambda/4$ emitter in reference to the first resonance frequency.

The limbs of the second partial structure can have an overall length that depends on the second resonance frequency. In particular, the second resonance frequency (that is to be initiated) can depend upon the overall length of the limbs of the second partial structure and on at least one characteristic, in particular on the capacitance, of the coupling region between the first partial structure and the second partial structure.

It is consequently possible by virtue of the overall length of the limbs and/or by virtue of the design of the coupling region to determine the different frequency ranges of the multiband loop antenna in a precise manner.

As is already stated above, the multiband loop antenna can comprise an electrically conductive second layer of the circuit board. Furthermore, the multiband loop antenna can comprise an electrically conductive second reference region on the second layer (wherein the second reference region can be located on the ground potential). The second reference region and the first reference region can be arranged at least in regions or entirely overlapping one another. The second reference region on the second layer can be connected in an electrically conductive manner via one or more plated through-holes (in other words outputs) to the first reference region on the first layer. It is thus possible by providing a second reference region to further reduce the sensitivity of the multiband loop antenna with respect to variances in the environment.

In accordance with a further aspect, an electrical device, in particular a household appliance or a home appliance is described that comprises a communication unit for wireless communication (in particular via WLAN), wherein the communication unit has the multiband loop antenna that is described in this document.

It is to be noted that the apparatuses and systems that are described in this document can be used both alone as well as in combination with other apparatuses and systems that are described in this document. Furthermore, any aspects of the apparatuses and systems that are described in this document can be combined with one another in diverse ways. In particular, the features of the claims can be combined with one another in diverse ways.

The invention is further described below with the aid of exemplary embodiments.

DETAILED DESCRIPTION OF THE INVENTION

As is stated in the introduction, the present document deals with providing a (dual band) antenna that can be integrated in an efficient manner into circuit boards that are dimensioned and/or designed differently and/or into different environments. The (dual band) antenna is to be designed in this case in particular for WLAN (wireless local area network) radio communication in the frequency bands at 2.4 GHz and at 5 GHz.

Figure 1A:
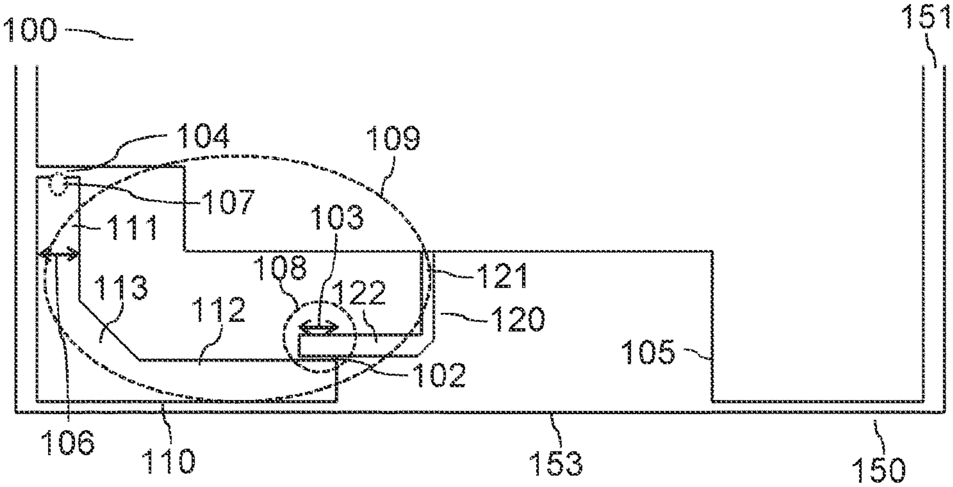
FIG. 1*a* shows the upper or the first outer layer of a circuit board having an antenna.
Figure 1B:
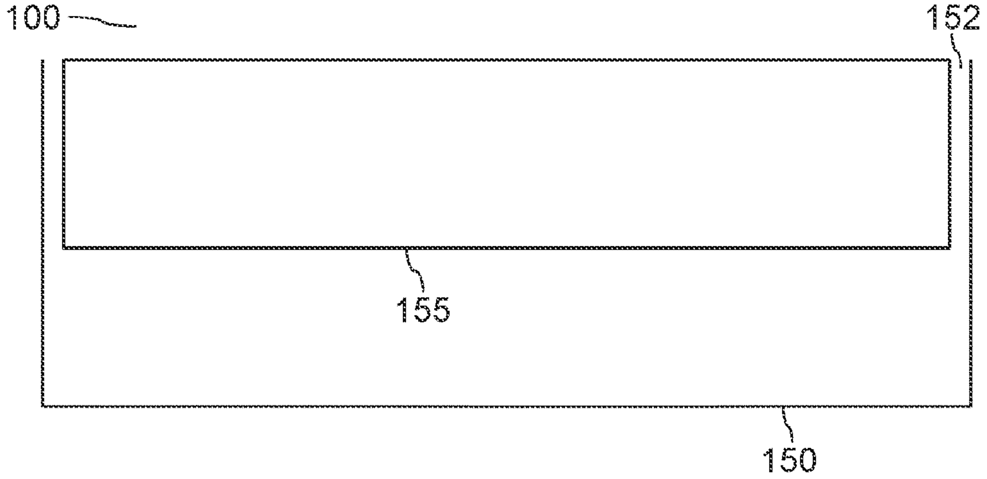
FIG. 1*b* shows the lower layer or the second outer layer of a circuit board.
Figure 1C:
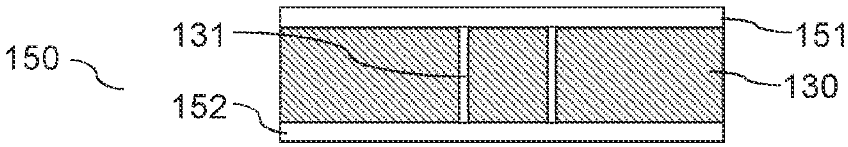
FIG. 1*c* shows a cross section through a circuit board having an antenna.

FIGS. 1*a* and 1*b* illustrate an exemplary antenna 100 that is integrated onto a circuit board 150. In particular, FIG. 1*a* illustrates the (electrically conductive) upper layer 151 of the circuit board 150 and FIG. 1*b* illustrates the (electrically conductive) lower layer 152 of the circuit board. As is illustrated in FIG. 1*c*, one or more dielectric layers 130 and also where applicable one or more (electrically conductive) intermediate layers (not illustrated) are located between the upper (in other words the first) layer 151 and the lower (in other words the second) layer 152. The electrically conductive layers 151, 152 can have a layer of metal, in particular copper. The metal can be removed in part regions of the layers 151, 152 (for example etched away) in order to form different electrically conductive part regions within a layer 151, 152, wherein the part regions are typically electrically insulated from one another.

The upper layer 151 has an electrically conductive antenna structure that forms a magnetic antenna or a loop antenna. The antenna structure has a first (L-shaped) partial structure 110 that is designed as an antenna for a first frequency or for a first frequency range (approximately 2.4-2.5 GHz). For this purpose, the limbs 111, 112 of the first L-shaped partial structure 110 together can have a specific overall length in order to form a λ/4 emitter for the first frequency range.

Moreover, the antenna structure has a second (L-shaped) partial structure 120 that is designed as an antenna for a second frequency or for a second frequency range (approximately 5.1-5.8 GHz). For this purpose, the limbs 121, 122 of the second L-shaped partial structure 120 together can have a specific overall length in order to form a λ/4 emitter for the second frequency range (where applicable in combination with a characteristic, in particular the capacitance, of the coupling region 108 between the two partial structures 110, 120).

The two L-shaped partial structures 110, 120 are arranged on the upper layer of the circuit board 150 in such a manner that the partial structures 110, 120 together with a reference region 105 form a loop 109 on the upper layer 151. In particular, the first limb 111 of the first partial structure 110 can extend away from the reference region 105. The second limb 112 of the first partial structure 110 can then extend in a perpendicular manner with respect to the first limb 111 of the first partial structure 110 (and consequently parallel to the reference region 105). In a corresponding manner, the first limb 121 of the second partial structure 120 can extend away from the reference region 105. The second limb 122 of the second partial structure 120 can then extend perpendicular to the first limb 121 of the second partial structure 120 (and consequently parallel to the reference region 105).

The second limbs 112, 122 of the two partial structures 110, 120 can extend parallel with respect to one another in the coupling region 108, wherein a coupling gap 102 is located between the second limbs 112, 122 of the two partial structures 110, 120. The gap width of the gap 102 and/or the length 103 of the overlap of the second limbs 112, 122 of the two partial structures 110, 120 can be selected in order to provide on the one hand an optimized compromise between as strong a capacitive coupling as possible of the two partial structures 110, 120 and on the other hand to provide as great as possible a selectivity and/or delimitation of the two frequency ranges. Alternatively or in addition thereto, the gap width and/or the length 103 of the gap 102 can be selected or determined so as to set the second resonance frequency for the second frequency range.

The first limb 121 of the second partial structure 120 can be connected in an electrically conductive manner to the reference region 105. On the other hand, an electrically non-conductive gap 104 is arranged between the first limb 111 of the first partial structure 110 and the reference region 105. At this point of the first limb 111 of the first partial structure 110 the signal that is to be transmitted can be fed in or a signal that is received can be output. In other words, this point of the first limb 111 of the first partial structure 110 can form the feed in point 107 of the antenna 100.

The frequency selectivity of the respective frequency range can be set or adapted by the limb width 106 of the limbs 111, 112, 121, 122 of the partial structures 110, 120. In this case, typically the bandwidth of a frequency range can be reduced by reducing the limb width 106 while the bandwidth of the frequency range can be increased by increasing the limb width 106.

Alternatively or in addition thereto, an (electrically conductive) transition region 113 that is broadened (in comparison with the limb width 106) can be arranged at the transition between the two limbs 111, 112 of a partial structure 110. The bandwidth of the frequency range can be increased by the use of a transition region 113 having increased width.

The antenna 100, in particular for the shielding, can have a reference region 155 on the lower layer 152 of the circuit board 150 and the reference region 155 can be arranged directly opposite the reference region 105 of the upper layer 151. The two reference regions 105, 155 can be connected to one another in an electrically conductive manner via electrically conductive vias or plated through-holes 131.

Consequently, an antenna 100 is described that has L antennas as partial structures 110, 120. An L antenna is in this case an antenna in the form of a letter "L". It is possible by the nesting of the two L antennas 110, 120 (together with the reference region 105) to form a loop antenna that has two resonance frequencies. It is possible by way of the capacitive coupling between the two L antennas 110, 120 in the coupling region 108 to set the second resonance frequency of the antenna 100 (for the second frequency range).

The position of the parasitic element (in other words, of the second part region or the second L antenna 120) for the higher (second) frequency range, which is connected in an electrically conductive manner to the ground surface (in other words to the reference region) 105 can be selected so that the parasitic element is removed as much as possible from the edge 153 of the circuit board 150. It is thus possible to achieve that changes in the environment of the antenna 100 (for example an installation of the antenna 100 in an appliance with or without plastic housing) change the characteristics of the resonance frequency (for the second frequency range) as little as possible.

Furthermore, the first L antenna 110 for the lower (first) frequency range can be designed as wider in the bend of the "L" in order to ensure a greater bandwidth in the first frequency range.

Possible fluctuations in the environment of the antenna 100 (with or without plastic) can be absorbed by the antenna 100 that is described in this document and it is possible to initiate that the input impedance of the antenna 100 is almost independent of the environmental conditions of the antenna 100. Furthermore, the described antenna 100 has a relatively low requirement for space.

The present invention is not limited to the illustrated exemplary embodiments. In particular, it is to be noted that the description and the figures are only to illustrate the principle of the proposed apparatuses and systems.

The invention claimed is:

1. A multiband loop antenna, comprising:

a circuit board having a first layer;

a first electrically conductive L-shaped partial structure disposed on said first layer of said circuit board, said first partial structure having a first resonance frequency, and said first partial structure having a feed in point of the antenna;

a second electrically conductive L-shaped partial structure disposed on said first layer of said circuit board, said second partial structure configured for a second resonance frequency;

said first partial structure and said second partial structure being capacitively coupled to one another in a coupling region;

an electrically conductive first reference region;

said first partial structure and said second partial structure disposed on said first layer of said circuit board together with said first reference region forming a loop;

said first partial structure having a first limb extending away or extending perpendicularly away from said first reference region;

said second partial structure having a first limb extending away or extending perpendicularly away from said first reference region;

said first partial structure having a second limb extending or extending perpendicularly relative to said first limb of said first partial structure, towards said second partial structure;

said second partial structure having a second limb extending or extending perpendicularly relative to said first limb of said second partial structure, towards said first partial structure;

said first partial structure having a transition region interconnecting said first and second limbs of said first partial structure, said transition region of said first partial structure having a first surface disposed at an angle relative to said first and second limbs of said first partial structure, and said first surface facing in a first direction;

said second partial structure having a transition region interconnecting said first and second limbs of said second partial structure, said transition region of said second partial structure having a second surface disposed at an angle relative to said first and second limbs of said second partial structure, and said second surface facing in a second direction opposite to said first direction.

2. The multiband loop antenna according to claim 1, wherein:

said second partial structure is electrically conductively connected to said first reference region; and an electrically insulating gap is disposed between said first partial structure and said first reference region.

3. The multiband loop antenna according to claim 2, wherein said feed in point is disposed on an end of said first partial structure facing said electrically insulating gap disposed between said first partial structure and said first reference region.

4. The multiband loop antenna according to claim 1, wherein said first L-shaped partial structure and said second L-shaped partial structure together form a U-shape.

5. The multiband loop antenna according to claim 1, wherein at least one of:

said second limb of said first partial structure adjoins said second limb of said second partial structure in said coupling region; or said second limb of said first partial structure and said second limb of said second partial structure extend parallel to one another in or out of said coupling region; or a part of said second limb of said first partial structure and a part of said second limb of said second partial structure extend directly adjacent one another in said coupling region and are spaced from one another by an electrically insulating coupling gap.

6. The multiband loop antenna according to claim 5, wherein said part of said second limb of said first partial structure and said part of said second limb of said second partial structure extending directly adjacent one another in said coupling region, each correspond to less than 50% of a limb length of said respective second limb.

7. The multiband loop antenna according to claim 5, wherein said part of said second limb of said first partial structure and said part of said second limb of said second partial structure extending directly adjacent one another in said coupling region, each correspond to less than 30%, of a limb length of said respective second limb.

8. The multiband loop antenna according to claim 5, wherein:

said first limb of said first partial structure and said first limb of said second partial structure extend to an edge of said circuit board; and said second limb of said first partial structure is disposed in said coupling region closer to said edge of said circuit board than said second limb of said second partial structure.

9. The multiband loop antenna according to claim 1, wherein at least one of said first partial structure or said second partial structure has an increased width relative to a limb width of said limbs in said transition region between said limbs of said respective partial structures.

10. The multiband loop antenna according to claim 1, wherein at least one of:

said first and second limbs of said first partial structure have an overall length depending on the first resonance frequency; or said first and second limbs of said second partial structure have an overall length depending on the second resonance frequency.

11. The multiband loop antenna according to claim 10, wherein the second resonance frequency depends on the overall length of said first and second limbs of said second partial structure and on a characteristic or a capacitance of said coupling region.

12. The multiband loop antenna according to claim 1, wherein:

said circuit board has an electrically conductive second layer;

an electrically conductive second reference region is disposed on said second layer; and said second reference region on said second layer is electrically conductively connected through one or more plated through-holes to said first reference region on said first layer.

13. A household appliance, comprising a communication unit having a multiband loop antenna according to claim 1.

14. The multiband loop antenna according to claim 1, wherein said first surface faces toward an anterior of the multiband loop antenna, and said second surfaces faces toward an exterior of the multiband loop antenna.

15. The multiband loop antenna according to claim 14, wherein said first surface is longer than said second surface.

* * * * *